(12) United States Patent
Tramposch

(10) Patent No.: US 6,412,628 B1
(45) Date of Patent: Jul. 2, 2002

(54) APPARATUS FOR PREVENTING THE FORMATION OF METAL TARNISH

(75) Inventor: Walter George Tramposch, Moon Township, PA (US)

(73) Assignee: Calgon Carbon Corporation, Pittsburgh, PA (US)

( * ) Notice: Subject to any disclaimer, the term of this patent is extended or adjusted under 35 U.S.C. 154(b) by 0 days.

(21) Appl. No.: 09/532,476

(22) Filed: Mar. 22, 2000

(51) Int. Cl.7 ............................................... B65D 81/24
(52) U.S. Cl. .................... 206/207; 53/400; 53/111 RC; 422/8
(58) Field of Search ............................ 53/400, 428, 432, 53/510, 111 RC; 206/207, 553; 422/8

(56) References Cited

U.S. PATENT DOCUMENTS 1,939,497 A * 12/1933 Herring ..................... 206/207
2,151,053 A * 3/1939 Solberg
2,506,731 A * 5/1950 Moss ............................. 422/8
2,594,483 A * 4/1952 Naken .................... 206/553 X
3,620,409 A * 11/1971 Rosenbaum
3,642,998 A * 2/1972 Jennings ..................... 206/207
4,058,362 A * 11/1977 Sinclair ......................... 422/8
5,154,886 A * 10/1992 Franey et al. .................. 422/8

* cited by examiner

Primary Examiner—Stephen F. Gerrity
(74) Attorney, Agent, or Firm—Cohen & Grisby, P.C.

(57) ABSTRACT

An apparatus and a method for substantially preventing tarnish from forming on metal objects such as silver, copper or brass objects. It comprises an enclosure for substantially sealing within a metal object and for substantially surrounding the metal object within the enclosure. The invention also provides for the regeneration and reuse of the adsorbent by washing the adsorbent with solvent and subsequently heating to a temperature less than about 350° C. to restore an adsorptive capacity of said adsorbent.

10 Claims, 3 Drawing Sheets

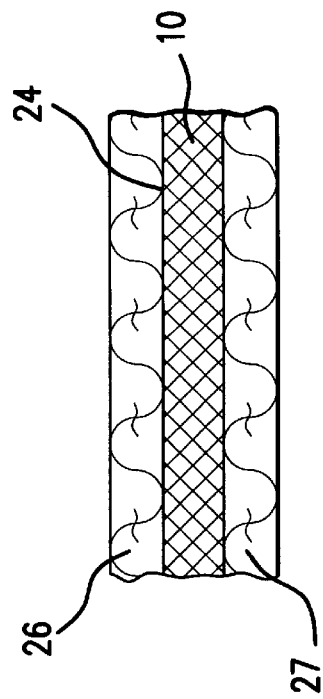
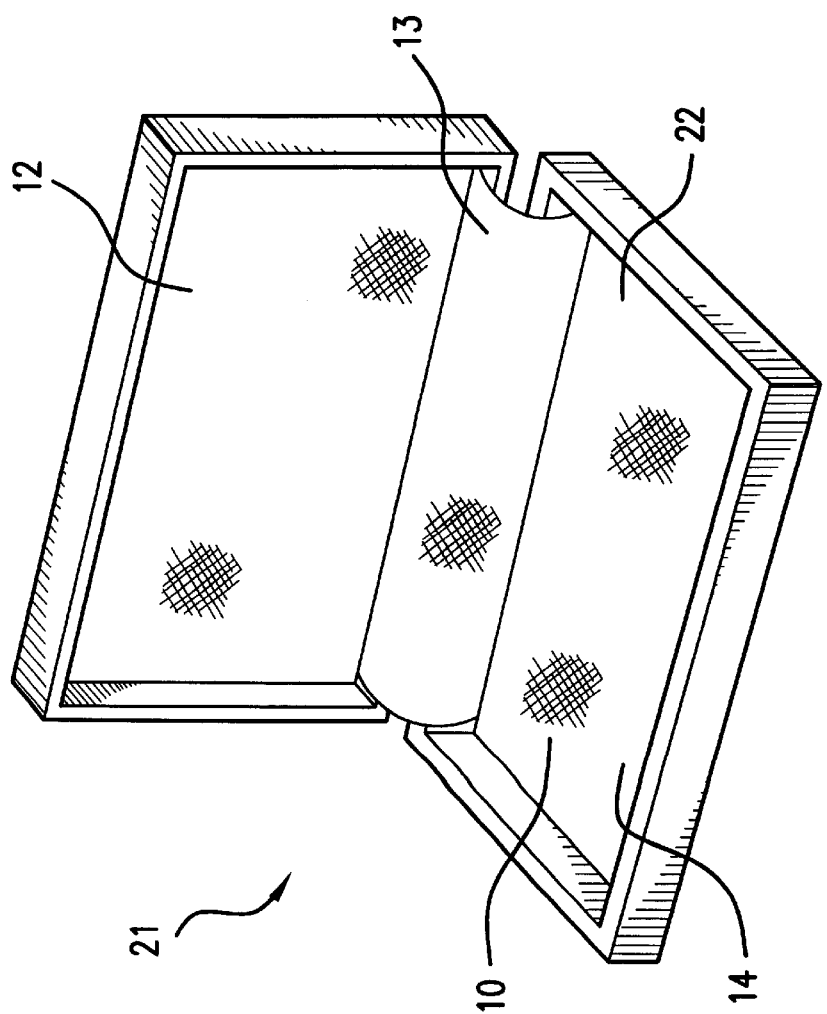

APPARATUS FOR PREVENTING THE FORMATION OF METAL TARNISH

FIELD OF INVENTION

The present invention relates to an apparatus and a method for preventing the formation of tarnish on silver, copper, or brass objects. In particular, the present invention relates to a construction of such apparatus using carbonaceous adsorbents to significantly reduce or eliminate tarnishing agents from contacting of such objects.

BACKGROUND OF THE INVENTION

Tarnish is a term which describes the visual change in the lustrous surface of a metal after it has reacted with various atmospheric components. Most frequently, tarnish is associated with the discolorization of objects made of silver; silver alloys, in which silver is the predominant component; copper; or brass, which is an alloy of copper and zinc. The chemical process which causes tarnish is the corrosion of the metal surface through an oxidative process. However, the primary route of oxidation, in many instances, can be caused by materials other than oxygen. It is well known that silver and silver alloys tend to tarnish in the gaseous atmospheres containing hydrogen sulfide or other sulfide compounds, even in small concentrations, particularly in the simultaneous presence of ammonia, resulting in a dull or black finish. Copper reacts with hydrogen sulfide in a similar fashion as silver because both elements have the same outermost electron shell configuration according to the Periodic Table. However, copper is more reactive than silver and after the initial tarnishing by hydrogen sulfide to produce a red or dark brown surface, it can further react with carbon dioxide in the atmosphere to produce a green patina which has been associated with older copper structures such as the Statue of Liberty.

The sources and concentrations of hydrogen sulfide in the atmosphere and indoor air are varied. Man-made sources of hydrogen sulfide include industrial emissions from the burning of fossil fuels, natural gas, chemical plants, poorly ventilated sewage lines, sewage treatment facilities, and farms. Natural sources include geothermal emissions, anaerobic bacterial processes, and salt water bodies. In the indoor environment, gaseous by-products from human digestive processes are a major source. It is, therefore, difficult to place a value on what might be considered an average or typical range for hydrogen sulfide concentrations in the atmosphere or indoor environment. The U.S. Environmental Protection Agency ("USEPA") has estimated that the average concentration for hydrogen sulfide in the atmosphere is 0.1 to 0.3 parts per billion ("ppb") (see USEPA report number EPA/600/8-86/026F, *Health Assessment Document for Hydrogen Sulfide*, January 1993). It should be clearly noted that this is an average concentration and peak levels may be higher by several hundred fold as is evident in the USEPA report.

The control of hydrogen sulfide also has long been a concern in the area of prevention of corrosion, due to low levels of hydrogen sulfide, of silver and copper electronic contacts in sensitive electronic equipment. The tarnishing and corrosion of silver and copper contacts can result in the premature failure of electronic equipment.

Sulfide films on silver or copper objects can be removed from their surfaces by chemical treatment or polishing. The formation of sulfide films can be prevented by forming on the objects a film of another stable metal, such as rhodium, or of oxide of aluminum, beryllium, technetium, or zirconium. However, all of these methods have disadvantages. Chemical treatment and polishing gradually remove part of the original metal. Accidental scratches in the film of stable metal or oxides expose the fresh silver or copper surface to attack by hydrogen sulfide.

Therefore, it is an object of the present invention to provide an apparatus and a method for preventing or inhibiting the formation of tarnish on objects made of silver, copper, or mixtures thereof. It is a further object of the present invention to provide regenerable activated carbon articles forming interior surfaces or linings of such an apparatus for surrounding such objects. These and other objects of the present invention will become apparent upon a perusal of the present disclosure.

SUMMARY OF THE INVENTION

In general, the present invention provides an apparatus comprising flexible adsorbent articles for enclosing objects made of silver, copper, or mixtures thereof significantly reduce or eliminate tarnishing agents from therein and to prevent or inhibit the formation of tarnish on such objects. The flexible articles comprise one or more adsorbents, such as activated carbon, natural or synthetic zeolite, activated alumina, or silica gel. These adsorbents may be incorporated in flexible fibrous matrixes which are capable of being formed into a variety of shapes.

One particularly suitable adsorbent is activated carbon cloth ("ACC"), which has a faster adsorption kinetics than the common forms of activated carbon, is manufactured in thermal processes from woven or non-woven natural, man-made, or synthetic fibers and which possesses a high surface area for adsorption. The raw material fiber is preferably chosen for its desirable properties. Flexible ACC removably attaches to interior surfaces or linings so that the ACC substantially surrounds the metal objects to be protected.

Commonly encountered tarnishing agents include hydrogen sulfide, sulfur oxides, carbonyl sulfide, carbon disulfide, nitrogen oxides, ozone, halogen gases, ammonia, ammonium salts, and mixtures thereof. The reaction of many of these tarnishing agents on silver, copper, and mixtures thereof may be accelerated in the presence of water vapor. When the adsorptive capacity of the ACC has been exhausted, it may be removed from the apparatus and regenerated for reuse. Regeneration may be achieved by, for example, washing the ACC and heating it to a temperature less than about 350° C. The regenerated ACC may then be reinserted or reattached to the apparatus to provide continued protection of the metal objects.

BRIEF DESCRIPTION OF THE DRAWINGS

FIG. 1 is a perspective drawing of one embodiment of the present invention showing a storage box with ACC removably attached to the interior surfaces of the box.

FIG. 1a shows ACC laminated with an adhesive between layers of protective fabric or cloth.

DETAILED DESCRIPTION OF THE PREFERRED EMBODIMENTS

Figure 2:
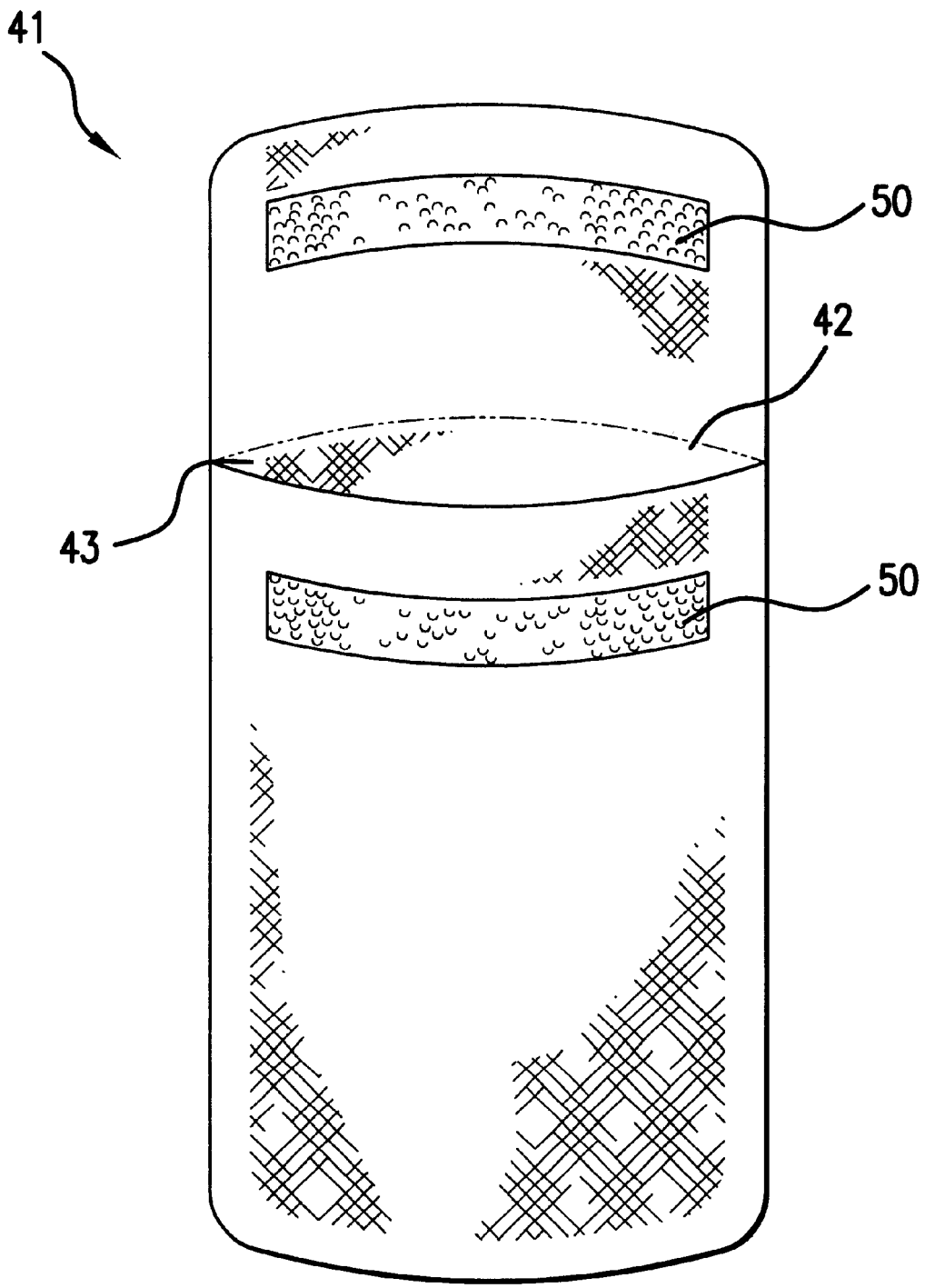
FIG. 2 is a perspective drawing of another embodiment of the present invention showing a resealable bag, the interior surface of which is lined with ACC.

The present invention uses adsorbents capable of removing tarnishing agents from atmospheric air. Adsorbents having high adsorptive capacity for hydrogen sulfide, sulfur oxides, carbonyl sulfide, carbon disulfide, nitrogen oxides, ozone, halogen gases, ammonia and ammonium salts includes activated carbon, natural and synthetic zeolite, activated alumina and silica gel. The presently preferred adsorbent is ACC which generally is activated carbon in the form of woven, non-woven, or knitted fabric, cloth, or sheet.

ACC may be suitably manufactured, for example, from cotton, cellulose, cellulose derivatives, wool, polyester, rayon, nylon, polyethylene, polypropylene, polytetrafluoroethylene, polyamide, polyacrylonitrile, other polymeric materials or combinations thereof. Other suitable man-made raw materials are pitches derived from coal tar or petroleum residues. Any of these materials may be formed into micron-sized fibers or filaments, several of which may be bundled together to produce a yarn. The yarn may be woven or knitted together to form a fabric or cloth. Alternatively, sections of the micron-sized fibers or filaments may be compressed or attached together to form a felt, mat or sheet. Rayon fiber produced by the viscose process is a particularly suitable raw material for the production of ACC.

The woven, non-woven, or knitted fabric, felt, mat or sheet of the chosen fiber is carbonized thermally at a temperature less than about 500° C. in an atmosphere of carbon dioxide, air, nitrogen or a combination thereof. The carbonized fiber may be impregnated with one or more halides of zinc, aluminum, magnesium, calcium, iron and ammonium; or phosphoric acid and dried prior to thermal carbonization because these chemicals have been known to result in a higher yield of the carbonized material. The preferred halides are chlorides; but fluorides, bromides, or iodides also may be used. The total amount of impregnants will depend upon the raw material used, but it typically amounts to less than 20 percent by weight of the raw material.

Subsequent to the thermal carbonization step, the carbonized material is further treated thermally at a temperature greater than about 700° C. preferably in an inert gas atmosphere such as nitrogen, helium, argon, krypton, xenon, or a combination thereof. However, it may be desirable in some instances to carry out the thermal treatment in an atmosphere comprising steam or carbon dioxide to impart desirable properties to the ACC. For example, this type of atmosphere may be desirable to provide a lower-density ACC. If the fabric is impregnated with metal halides or phosphoric acid prior to carbonization, the thermally treated material may be desirably washed with a solvent such as water and dried to remove the impregnants. The thermally treated carbonaceous woven, non-woven, or knitted fabric, felt, mat, or sheet possesses a high adsorptive rate and capacity for hydrogen sulfide, sulfur oxides, carbonyl sulfide, carbon disulfide, nitrogen oxides, ozone, halogen gases, ammonia, ammonium salts, and mixtures thereof. The ACC may be desirably impregnated with compounds which enhance its adsorptive capacity for these contaminants.

In a preferred embodiment of the present invention, shown in FIG. 1, ACC 10 was removably attached to interior surfaces 12, 13 and 14 of a storage case 21. The surfaces of the ACC facing the interior of the storage case were covered with a decorative or protective fabric or cloth 22. Alternatively, the ACC may be pressure laminated with an adhesive 24 between two layers of protective fabric or cloth 26 and 27, shown in FIG. 1a, before being removably attached to the interior surfaces of the storage case 21. Adhesive 24 and protective fabric or cloth 26 and 27 used for the lamination process are preferably chosen such that the laminated ACC piece may be regenerated by washing with a solvent such as water and heating up to 350° C. after its adsorptive capacity has been exhausted. The ACC-lined storage case 21 of the first preferred embodiment of the present invention provide protection against atmospheric tarnish agents to valuables objects such as jewelry, silverware, coins, brass musical instruments, and the like.

In another preferred embodiment of the present invention, shown in FIG. 2, a resealable bag 41 was lined with ACC 42 and covered with fabric or cloth 43. Resealable bag 41 may have a closure means 50, preferably constructed of Velcro®. Alternatively, the ACC 42 could be laminated between two layers of protective fabric or cloth prior to being affixed inside the bag. The resealable bag may also be constructed to accommodate washing (and heating) for reuse when the adsorptive capacity of the ACC has been exhausted, in the manner described above.

TESTING OF A STORAGE CASE OF THE PRESENT INVENTION

Figure 3:
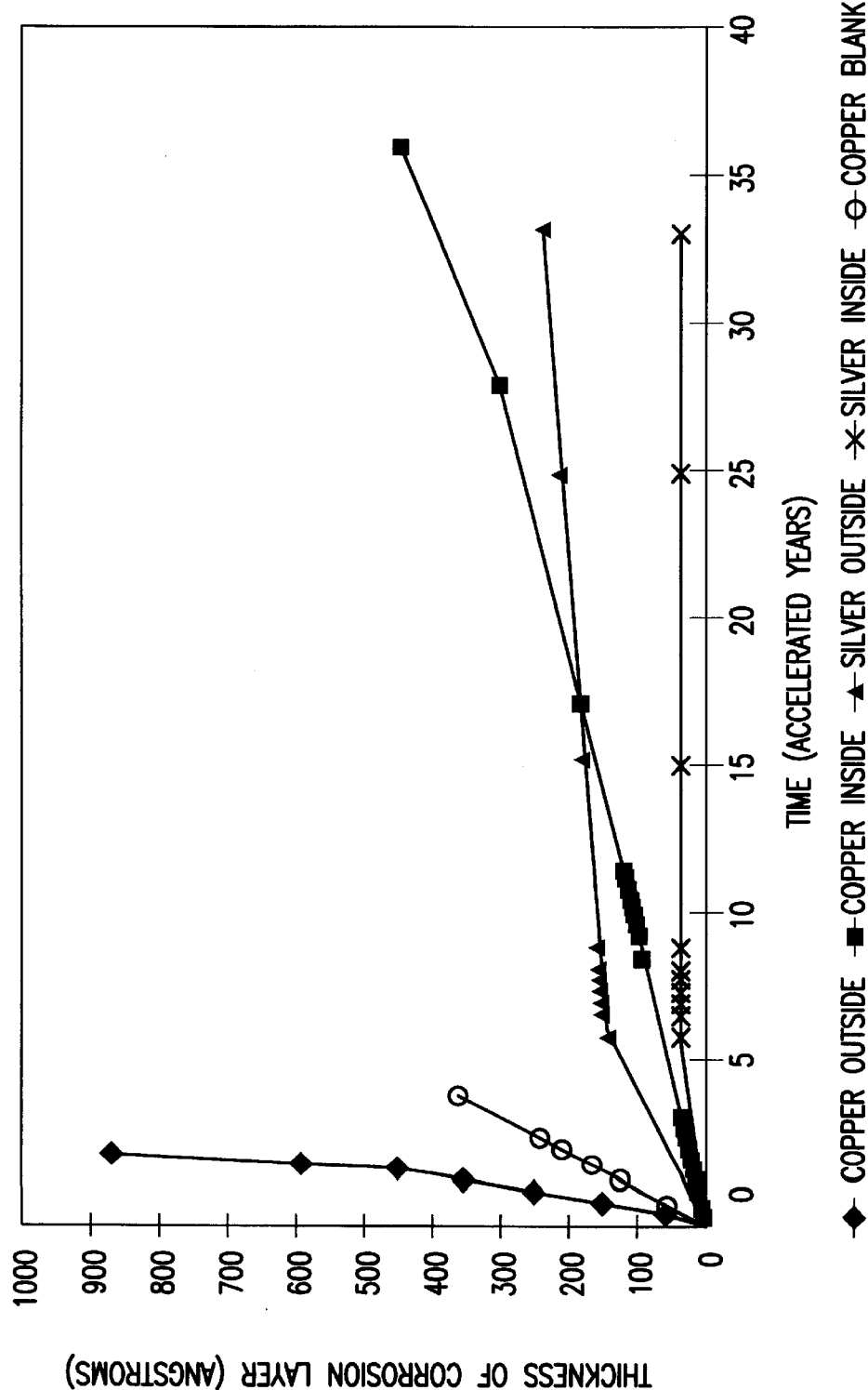
FIG. 3 shows corrosimetry data of silver and copper, unprotected and protected by an apparatus of the present invention, in an atmosphere containing 1,000 ppb (by volume) of hydrogen sulfide.

A commercial jewelry box (purchased from K-Mart Corporation) fitted with FM1-250 ACC (available from Calgon Carbon Corporation, Pittsburgh, Pa.) in the interior thereof, including the ring cushions and around the closure surface, was tested for its ability to prevent the tarnish of silver and copper. A gap of approximately $1/16$ inch remained between the lid and the box sealing surfaces when the box was closed. The jewelry box was placed in a test chamber consisting of a plastic desiccator which was continuously purged with a stream of high humidity air (80% relative humidity ("RH")) containing 1000 ppb (by volume) of hydrogen sulfide. Silver and copper articles (sterling jewelry and coins) were placed inside and outside of the modified jewelry box in the test chamber along with commercially available corrosimeter probes constructed of silver and copper. Clean copper coins placed outside of the modified jewelry box showed visible tarnish in a period of 1 hour (accelerated 0.5 years). Silver jewelry showed visible tarnish in 6 hours (accelerated 2.3 years) in the same environment. Test results are shown in FIG. 3. These results are consistent with the relative rates of silver and copper tarnish based on chemical reactivity, copper being a more reactive metal than silver. After extended periods of time, the tarnish of the silver jewelry became very pronounced with blackening of the object. Lower grade silver articles would be expected to exhibit tarnish in a shorter period of time.

The level of hydrogen sulfide used in the experiments was far in excess of the normal average encountered in the atmosphere (0.1 to 0.3 ppb). This was done in order to accelerate the tarnishing process from what is normally months and years to days. High RH also accelerates the tarnishing process. The factor used to calculate the time accelerated corrosion results was 3333 (i.e., 1000/0.3) since it has been known that corrosion, and therefore, tarnishing of silver, is linear with concentration (J. P. Franey and G. W. Kammlott, *Corrosion Science*, Vol. 25, p. 133 (July 1985)). It is important to note that the average hydrogen sulfide concentrations reported by the USEPA do not take into account peak levels which may be several hundreds of times higher.

In the unprotected environment, copper and silver exhibited high corrosion rates as were measured in corrosimeter probes. The corrosion rates were determined with a Rohrback Cosasco Model CK-3 Corrosimeter (Rohrback Cosasco Systems, Inc., Santa Fe Springs, Calif.). These corrosion rates are much higher than the most severe classification (GX) for corrosion as is adopted by the Instrument Society of America, which corresponds to a corrosion rate of greater than 2000 Angstrom per accelerated month for copper.

Silver jewelry and copper coin protected by the ACC-lined jewelry box exhibited markedly decreased tarnish within the same corrosive environment. The silver jewelry did not exhibit any visible tarnish throughout the experiment (accelerated 35 years). The copper coin showed slight visible tarnish after an accelerated 15 years. The corrosimeter results indicated a 90% reduction of the corrosiveness, as is exhibited by the relative corrosion rates of the corrosimeter probes located inside and outside of the jewelry box, of the environment protected by the ACC even after an accelerated 15 years. Therefore, it is assumed that silver and copper stored within an apparatus of the present invention would be protected from tarnish for an extended period of time.

It is expected that the protection by an apparatus of the present invention would also extend to items fabricated from brass. It is estimated that under average atmospheric conditions, the protection period would be 15 years. The actual amount of time that the articles would be protected from tarnish would depend on the concentration of corrosive gases in the home, relative humidity, and the amount of time during which the jewelry box remains open. Of course, the degree of tarnish would also depend on the amount of time during which the articles are outside of the box and the atmosphere to which these articles are exposed.

While the foregoing has described the preferred embodiments and modes of operation of the present invention, it should be appreciated that numerous variations, changes, and equivalents may be made to these embodiments and modes of operation without departing from the scope of the present invention as is defined by the following claims.

What is claimed is:

1. An apparatus for substantially preventing tarnish from forming on a metal object, said apparatus comprising an enclosure for substantially sealing within said metal object, said enclosure having at least one adsorbent removably attached to an interior surface of said enclosure, wherein said adsorbent is disposed between two porous protective layers of fabric or cloth, and wherein at least one of said adsorbent is selected from the group consisting of woven, non-woven, and knitted activated carbon cloth and fabric; woven and non-woven activated carbon felt, mat, and sheet; and activated carbon particulate and granules disposed within flexible fibrous matrixes.

2. An apparatus for substantially preventing tarnish from forming on a metal object, said apparatus comprising an enclosure for substantially sealing within said metal object, said enclosure having at least one adsorbent attached therein, wherein said adsorbent is disposed between two porous protective layers of fabric or cloth, and wherein at least one of said adsorbent is selected from the group consisting of activated carbon, natural and synthetic zeolite, silica gel, activated alumina and mixtures thereof.

3. An apparatus for substantially preventing tarnish from forming on a metal object as recited in claim 1 or 2 wherein at least one of said adsorbent is impregnated with one or more halides of metal selected from the group consisting of zinc, aluminum, magnesium, calcium, iron and ammonium, or phosphoric acid.

4. An apparatus for substantially preventing tarnish from forming on a metal object as recited in claim 1 or 2 wherein at least one of said adsorbent is impregnated with one or more halides selected from the group consisting of chlorides, fluorides, bromides and iodides.

5. An apparatus for substantially preventing tarnish from forming on a metal object as recited in claim 1 or 2 wherein said metal is selected from the group consisting of silver, copper, brass and mixtures thereof.

6. An apparatus for substantially preventing tarnish from forming on a metal object as recited in claim 1 or 2 wherein said enclosure is selected from the group consisting of cases, boxes, bags and pouches.

7. An apparatus for substantially preventing tarnish from forming on a metal object as recited in claim 1 or 2 wherein said tarnish results in an increase in electrical resistance of metal objects.

8. An apparatus for substantially preventing tarnish from forming on a metal object as recited in claim 7 wherein objects are electrical contacts in electronic equipment.

9. An apparatus for substantially preventing tarnish from forming on a metal object as recited in claim 1 wherein at least one of said adsorbent is selected from the group consisting of activated carbon, natural and synthetic zeolite, silica gel, activated alumina and mixtures thereof.

10. An apparatus for substantially preventing tarnish from forming on a metal object as recited in claim 1 wherein said adsorbent is washed with solvent and subsequently heated to a temperature less than about 350° C. to restore an adsorptive capacity of said adsorbent.

* * * * *

(12) EX PARTE REEXAMINATION CERTIFICATE (7024th)
United States Patent
Tramposch

(10) Number: US 6,412,628 C1
(45) Certificate Issued: Aug. 25, 2009

(54) APPARATUS FOR PREVENTING THE FORMATION OF METAL TARNISH

(75) Inventor: Walter George Tramposch, Moon Township, PA (US)

(73) Assignee: Calgon Carbon Corporation, Pittsburgh, PA (US)

Reexamination Request:
No. 90/006,411, Oct. 11, 2002
No. 90/006,881, Dec. 5, 2003

Reexamination Certificate for:
Patent No.: 6,412,628
Issued: Jul. 2, 2002
Appl. No.: 09/532,476
Filed: Mar. 22, 2000

(51) Int. Cl.
*B65D 81/24* (2006.01)

(52) U.S. Cl. .................. 206/207; 422/8; 53/111 RC; 53/400

(58) Field of Classification Search .................. None
See application file for complete search history.

(56) References Cited

U.S. PATENT DOCUMENTS

| | | |
|---|---|---|
| 4,058,362 A | 11/1977 | Sinclair |
| 4,120,715 A | 10/1978 | Ockwell et al. |
| 4,153,505 A | 5/1979 | Ferguson |
| 4,331,148 A | 5/1982 | Steer et al. |
| 4,449,970 A | 5/1984 | Bevan et al. |
| 4,488,547 A * | 12/1984 | Mason ............... 128/202.22 |
| 5,417,743 A | 5/1995 | Dauber |
| 5,593,482 A | 1/1997 | Dauber et al. |
| 5,693,384 A | 12/1997 | Hollinger, Jr. |
| 5,764,435 A | 6/1998 | Sugimoto et al. |
| 5,869,009 A | 2/1999 | Bellefeuille et al. |
| 6,103,141 A | 8/2000 | Incorvia et al. |
| 6,135,986 A | 10/2000 | Leisner et al. |
| 6,146,446 A | 11/2000 | Tuma et al. |
| 6,168,651 B1 | 1/2001 | Tuma et al. |
| 6,214,095 B1 | 4/2001 | Logan et al. |
| 6,296,691 B1 | 10/2001 | Gidumal |

OTHER PUBLICATIONS

Activated Charcoal Cloth by Charcoal Cloth International LTD.*
Activated Charcoal Cloth by Charcoal Cloth Limited.*
3M Anti–Tarnish Strips and Tabs, website: www.sacredstone.com/antitarn.htm; Jan. 9, 2003.
Carlson, Janice H., "Preparations for the NEB: Winterthur's Experience with Materials Testing, Passive Scavengers and Monitors," Winterthur Museum, pp. 97–112.
Sucha S. Parmar and Daniel Grosjean, "Sorbent Removal of Air Pollutants From Museum Display Cases." Environmental International, vol. 17, pp. 623–630.
Siefried Rempel, "Zeolite Molecular Traps and Their Use in Preventative Conservation," WAAC Newsletter, vol. 18, No. 1, Jan. 1996.
Brochure from Patent Owner's Subsidiary, Charcoal Cloth (International) Ltd. Of England (the "Shakespeare Brochure") (Exh. B).
Brochure from Patent Owner's Subsidiary, Charcoal Cloth (International) Ltd. Of England (the "Double Lamination Brochure") (Exh. C).
Carlson, Janice H., "Preparation for the NEB: Winterthur's Experience with Materials Testing, Passive Scavengers and Monitors," Conference organized by the Scottish Society for Conservation and Restoration, Apr. 21–22, 1994, pp. 94–112 (Exh. D).
Marketing Material for 3M Silver Care Products (Exh.S).

* cited by examiner

*Primary Examiner*—Andres Kashnikow

(57) ABSTRACT

An apparatus and a method for substantially preventing tarnish from forming on metal objects such as silver, copper or brass objects. It comprises an enclosure for substantially sealing within a metal object and for substantially surrounding the metal object within the enclosure. The invention also provides for the regeneration and reuse of the adsorbent by washing the adsorbent with solvent and subsequently heating to a temperature less than about 350° C. to restore an adsorptive capacity of said adsorbent.

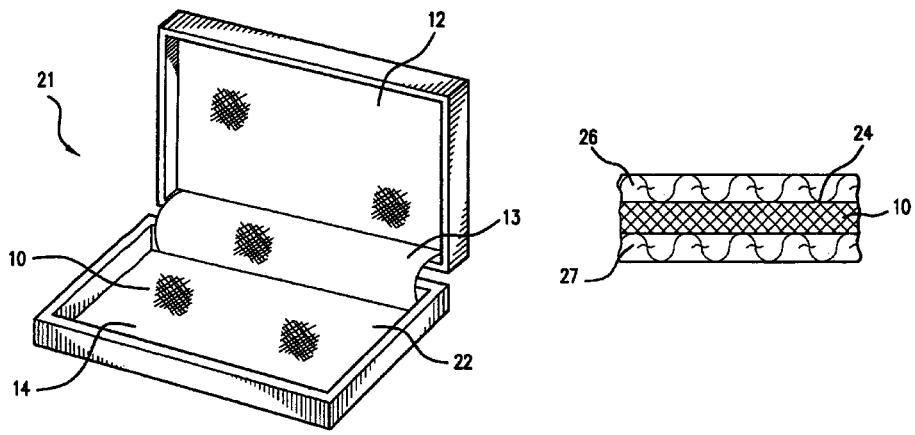

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–10 are cancelled.

New claims 11 and 12 are added and determined to be patentable.

*11. An apparatus for substantially preventing tarnish from forming on a metal object, said apparatus comprising an enclosure having a closeable opening for substantially sealing within said metal object, said enclosure having at least one adsorbent attached or removably attached therein, wherein said adsorbent is disposed between porous protective layers of fabric or cloth and substantially surrounds said metal object within said enclosure, and wherein at least one of said adsorbent is selected from the group consisting of activated carbon, natural and synthetic zeolite, silica gel, activated alumina and mixtures thereof, wherein at least one of said adsorbent is impregnated with one or more halides of metal selected from the group consisting of zinc, aluminum, magnesium, calcium, iron and ammonium, or phosphoric acid.*

*12. An apparatus for substantially preventing tarnish from forming on a metal object, said apparatus comprising an enclosure having a closeable opening for substantially sealing within said metal object, said enclosure having at least one adsorbent attached or removably attached therein, wherein said adsorbent is disposed between porous protective layers of fabric or cloth and substantially surrounds said metal object within said enclosure, and wherein at least one of said adsorbent is selected from the group consisting of activated carbon, natural and synthetic zeolite, silica gel, activated alumina and mixtures thereof, wherein at least one of said adsorbent is impregnated with one or more halides selected from the group consiting of chlorides, fluorides, bromides and iodides.*

\* \* \* \* \*